April 20, 1948.   H. C. WATERMAN   2,440,130
INVERSE FEEDBACK MOTOR CONTROL
Filed Sept. 21, 1944   2 Sheets-Sheet 1

INVENTOR
HERBERT C. WATERMAN
BY Cecil F. Arens
ATTORNEY

Patented Apr. 20, 1948

2,440,130

UNITED STATES PATENT OFFICE 2,440,130

INVERSE FEED-BACK MOTOR CONTROL

Herbert C. Waterman, South Bend, Ind., assignor to Bendix Aviation Corporation, South Bend, Ind., a corporation of Delaware Application September 21, 1944, Serial No. 555,125

7 Claims. (Cl. 318—158)

This invention relates to electrical control means for an apparatus which changes mechanical energy into electrical energy, and to electrical systems incorporating apparatus of this type, wherein the voltage output of the apparatus is fed back into the same for compensating for the IR losses.

In electrical systems of the type utilizing a drive motor having a generator electrically coupled thereto for supplying current to the drive motor whereby rotation of the motor is obtained, it is often desirable to provide a manual control having a variable rate characteristic, that is, a control having non-linear controller unit displacement versus motor speed. The control means of this invention comprises such a manual control, having the characteristics described, which at times, dependent upon the will of the operator is adapted to connect the generator exciter field winding directly across the total output voltage and at other times is adapted to connect the generator exciter field winding across only a percentage of the total output voltage. A specific application in which such a relationship of controller displacement and motor speed is not only desirable but imperative, involves a motor driven gun which may be mounted on a turret for use on aircraft. In general, upper turrets, for example, are designed to allow their guns to be moved through 90° elevation and through 360° azimuth, thus enabling the guns to be fired in any direction within a hemisphere which extends above horizontal in the present example. The electrical system shown is connected for moving the gun in elevation only. However, a like system may be employed for moving a turret, on which the gun is mounted, in azimuth. The speed control system is designed to move the guns from any position in their hemisphere to any other position at a velocity desired by the operator. It is to be understood that although the control means has been discussed with relation to a gun turret application, it is by no means restricted thereto but has general utility as will be shown later.

One of the principal objects of the invention lies in the provision of a control means, for use with an electrical generating system electrically coupled to a drive motor, which incorporates all the advantages of a high inverse feedback voltage at low generator output and eliminates the disadvantages of high inverse feedback voltage at high generator output.

Another important object of the invention resides in the provision of means for connecting the total output voltage of the generator across one of its windings so that the residual magnetism will be reduced to zero when the generator exciting current is zero.

A still further important object of the invention is the provision of means for reducing the inverse feedback voltage to zero when the exciting current is maximum, whereby full amplification of the generator is realized.

A further important object resides in the provision of means which varies the inverse feedback voltage on the generator from no voltage output to maximum voltage output in proportion to the undesirableness of hysteresis, residual flux and overcompensation.

A very important object is the provision of control means having a minimum of rheostats and switches and adapted to carry only the exciting current of the generator.

The above and other objects and features of the invention will be apparent from the description of the apparatus illustrated in the accompanying drawing, in which.

Figure 1:
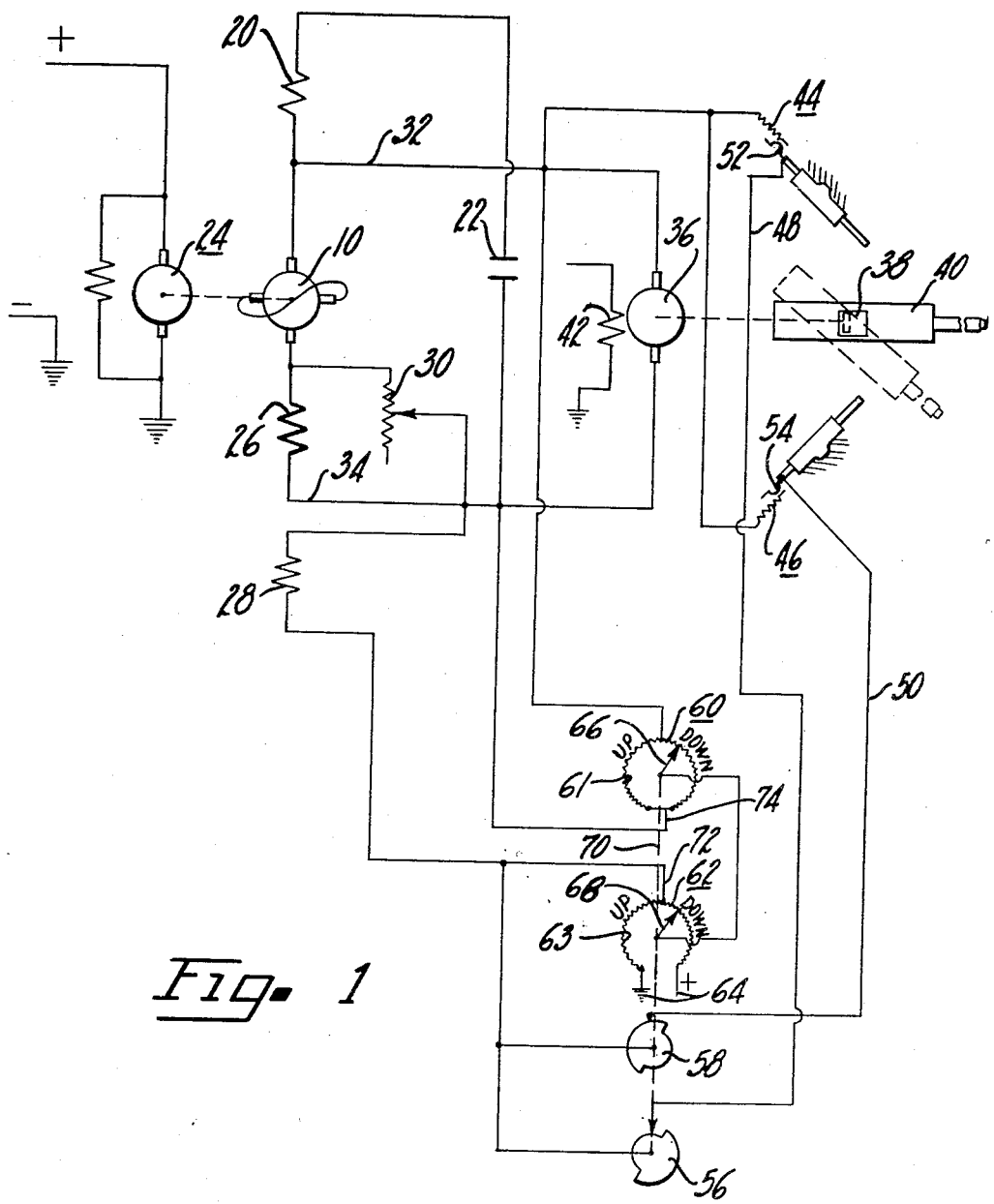
Figure 1 is a diagrammatic representation of an electrical system incorporating my invention shown associated with a gun for movement in elevation.

Referring to the drawing, Figure 1, reference numeral 10 indicates generally an armature of a direct current machine or dynamo of the Rosenburg type into which has been incorporated a stabilizing winding 20 connected to a condenser 22 adapted to render ineffectual, in a manner familiar to those skilled in the art, any electromechanical oscillations set up. The armature 10 is driven at a constant speed by any means such as a motor 24 which is coupled thereto. Besides the stabilizing winding 20 the dynamo comprises a compensating winding 26 and an exciting winding 28 which respectively enable the generator to be compounded and excited. A resistor 30 is connected in parallel with the compensating field for compounding the generator to obtain as near perfect regulation as possible. A pair of connections 32 and 34 connect an armature 36 of a drive motor which has a driving connection to a gear box 38 containing gears, not shown, adapted to elevate or depress a gun 40. The drive motor is separately excited by winding 42.

For decelerating the movement of the gun in elevation and depression after the gun has been moved to a predetermined position, a pair of rheostats 44 and 46 are connected to the wire 32 which connects the generator. Wires 48 and 50 connect slider arms 52 and 54 of rheostats 44 and 46 respectively to cam-like switches 56 and 58 which connect the rheostats 44 and 46 to the exciting winding 28, thence to the wire 34 which connects the other side of the generator. Switches 56 and 58 are adapted to be rotated simultaneously, as will be later described, so that switch 58 closes when depressing the gun, and switch 56 closes when elevating the gun.

Potentiometer 60 has a linear winding 61 which is connected in multiple with the dynamo output for supplying a variable inverse feedback voltage. Potentiometer 62 has a linear winding 63 which is connected to any suitable source, not shown, at 64 for providing a variable source of exciting voltage to exciting field 28. Arm 66 of potentiometer 60 is connected to arm 68 of potentiometer 62 to thereby provide an electrical connection between these two potentiometers for a purpose to be hereinafter described. A single shaft 70 mechanically connects the potentiometers 60 and 62, and the cam-like selector switches 56 and 58 to form a manual control means, so that movement of any one of the potentiometers will cause a similar movement of the other potentiometer and the selector switches. The exciting voltage appears across center tap 72 and the arm 68 of the exciting potentiometer 62 and is partially opposed by the inverse feedback voltage which appears across the arm 66 and connection 74 of the variable inverse feedback voltage potentiometer 60. It is the difference between these two voltages which causes current to flow through the exciting field 28. The current in the exciter field causes an output voltage to be generated by the dynamo, which voltage is impressed across the armature 36 of the drive motor and across the inverse feedback potentiometer. For any given position of the potentiometers 60 and 62 between neutral and maximum position a stable point is reached at which the difference between exciter voltage and the inverse feedback voltage causes just enough exciter field current to flow through field 28 to hold the dynamo output voltage nearly constant for that setting. This output voltage tends to be constant for any given setting of the potentiometers because any tendency of the output voltage to increase causes increased feedback voltage which reduces the exciter field current, and any tendency of the output voltage to decrease results in a reduced feedback voltage which is conducive to an increase in exciter field current.

With the arms 66 and 68 in neutral position, that is, with arm 68 contacting the center tap 72 of potentiometer 62 no exciting voltage exists across field 28 and any residual exciting flux in the dynamo which tends to produce an output voltage will cause exciter field current to flow in such a direction that an opposing flux is created, whereby the dynamo output voltage is immediately reduced to zero and maintained there. This result is maintained since the exciter field is now connected directly across the dynamo output terminals in the opposite relationship to that which would produce self-excitation. Rotation of potentiometers 60 and 62 clockwise or counterclockwise from the neutral position determines the direction of current through field 28 and the resultant direction of rotation of the drive motor armature 36. In Figure 1, for example, clockwise rotation causes motor 36 to rotate in a direction to depress the gun 40.

At a time when the potentiometer arms are deflected only slightly from neutral the feedback voltage, which is the voltage from arm 66 to wire 74 connecting the potentiometer 60 to the output wire 34, is nearly as great as the output voltage, and in this position of the potentiometer arm a low well regulated output voltage occurs. Also, with the potentiometer in this position the percentage of output voltage acting as inverse feedback voltage is high. Any further deflection of the arms will give a proportionately less percentage of the output voltage as feedback voltage and proportionately less and less voltage regulation, until at maximum deflection of the arms, maximum exciter field current will flow since there is no inverse feedback voltage to oppose the exciter voltage. At this time there is maximum dynamo output. It is to be noted that by proper proportioning the ohmic relationship of the potentiometers 60 and 62 and the exciter field 28, a variable rate characteristic may be obtained while still retaining linear potentiometer windings.

Where the dynamo is of the compensated type as shown in Figure 1, it is well known that exact compensating field action is impossible to obtain over entire output voltage range of the generator even with the use of the diverter resistor 30. However, with the use of inverse feedback voltage the compensating field action and the setting of the diverter resistor need not be so exact, since the greater the inverse feedback the greater will be the output voltage range over which exact compensating field action is obtained for a given setting of the diverter resistor. My system provides high inverse feedback at low voltage output with correspondingly high stability, and at the same time allows full electrical amplification at high voltage output because of the reduced inverse feedback. Since at high voltage output the generator tends to saturate and it would be impossible for the system to become overcompensated irrespective of the diverter resistor setting.

When the controller, comprising potentiometers 60 and 62, is turned clockwise the gun 40 will also turn clockwise or downwardly until it nearly reaches a point that would interfere with its clockwise movement, at which time the slider 54 is engaged to thereby move the slider onto and along the rheostat 46 as the gun progresses in its clockwise motion, reaching a minimum resistance position of the rheostat at the point of interference to clockwise motion. As the arm is moved along the rheostat the amount of exciter current flowing in the exciter field is decreasing, since the rheostat's shunting action is increasing, that is, part of the exciting current is being bypassed through switch 58 and rheostat 46 thereby reducing materially the flow through the exciter field. When the rheostat is completely shunted out of the circuit the exciter field is directly connected to the output of the dynamo so that all fluxes are nullified and the output voltage reduced to zero. This action causes smooth deceleration of the drive motor from whatever speed was maintained before the slider arm was engaged to full stop at the point of mechanical interference, at which point the gun has moved the slider arm to the end of the rheostat.

Figures 2, 3:
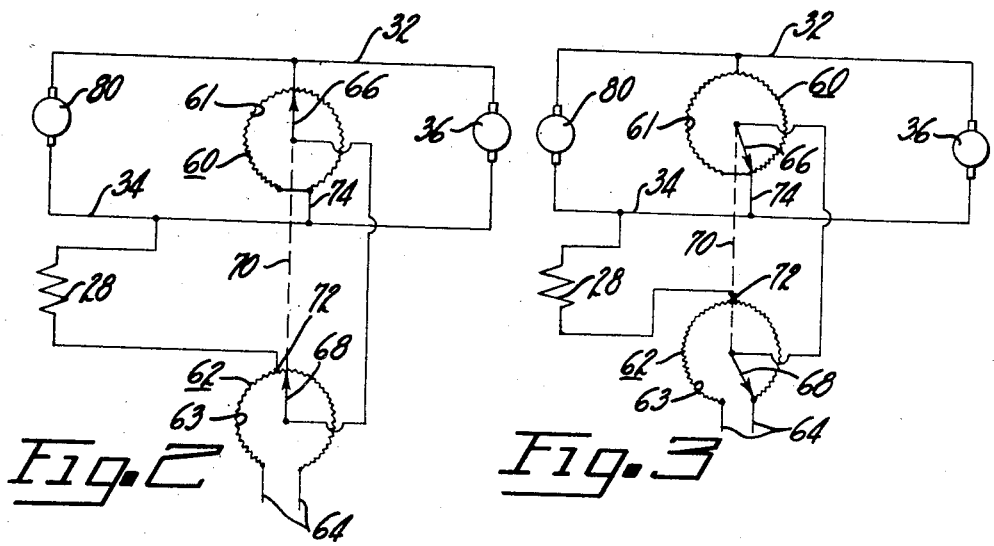
Figure 2 illustrates diagrammatically a general application of the control means of Figure 1 wherein the invention is employed in association with the conventional generator.
Figure 3 shows the system of Figure 2 in a position for supplying maximum exciting current to the generator.

The electrical system shown in Figures 2 and 3 is of general utility and comprises a conventional type dynamo 80, as distinguished from the Rosenburg type of Figure 1, and may be driven in any suitable manner. A drive motor having an armature 36 is connected to the output of the generator 80 by the connections 32 and 34. The inverse feedback voltage potentiometer 60 is connected in multiple with the output of the generator 80. The exciting potentiometer 62, which is connected at 64 to a source, not shown, has its arm 68 electrically connected to the arm 66 of the feedback potentiometer 60. The neutral point 72 of the exciting potentiometer is connected to one end of the exciting winding 28 and the other end of winding 28 is connected to the wire 34 of the output. The exciting voltage for the exciting field 28 appears across the center tap or neutral point 72 and the arm 68 of the potentiometer 62 and is partially opposed by the inverse feedback voltage appearing across the arm 66 and the connection 74 of the variable inverse feedback voltage potentiometer. Figure 3 illustrates the position of the potentiometers with zero per cent inverse feedback voltage and 100 per cent exciting voltage applied to winding 28. In this position of the controller there is no opposition to the exciter voltage since the inverse feedback voltage is zero. It is to be noted that like reference numerals represent similar parts in the drawing and that their constitution and function will be the same in the various figures.

Figure 4:
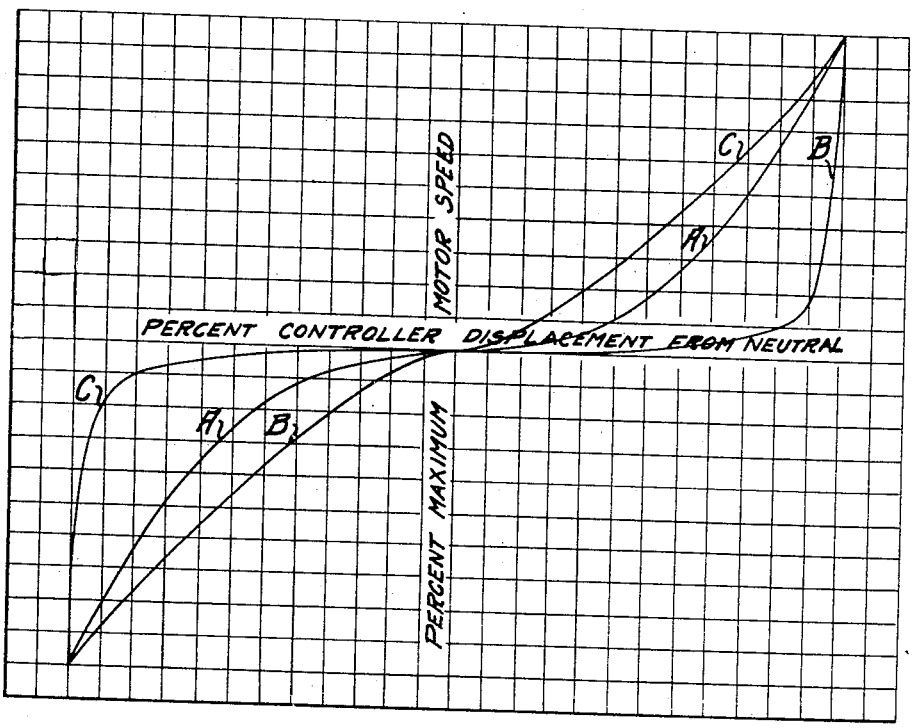
Figure 4 is a graphical representation showing percentage maximum motor speed versus percentage controller displacement from neutral.

As shown in Figure 4 the control system of the invention provides a complete range of motor control from zero to maximum speed in either direction as the controller is deflected through its complete range. Curve A shows a variable rate control characteristic which spreads the lower one-third range of motor speed over approximately the first two-thirds of controller deflection from neutral and the upper two-thirds range of motor speed over the last one-third of controller deflection from neutral. Any variable rate characteristic of the type shown in Figure 4 may be obtained, for example, in the region between the curves B and C but not limited thereto, by proper proportioning of the ohmic relationship of the two potentiometers and the exciter field, notwithstanding the use of linear potentiometer windings 61 and 63. Curve C approaches a curve having linear characteristics but will always be non-linear because of the inherent resistance in the exciter field and potentiometer windings.

I claim:

1. In combination, an electrical control system having a dynamo electrically connected to a drive motor armature for driving the same, a compensating winding in said dynamo, said winding adapted to tend to prevent changes in speed of the drive motor armature due to external loads, a diverter resistor shunting said compensating winding for varying the amount of compensation as required by said dynamo, an exciting winding in said dynamo for creating an exciting flux therefor, means for supplying an exciting current to said exciting winding and an inverse feedback voltage to said system, comprising a pair of potentiometers one of which is connected to the dynamo output and the other of which is connected to a separate source, and a shaft operatively connected to the potentiometers for driving the same, said potentiometers connected electrically one with respect to the other to supply an inverse feedback voltage to said system which inverse feedback voltage is high at low dynamo output voltage and is progressively decreased as the dynamo output voltage is increased, whereby full electrical amplification at maximum output voltage is obtained because of zero inverse feedback voltage at this time.

2. An electrical system for moving a gun and including a dynamo which is electrically connected to an armature of a drive motor, driving means connecting said armature to said gun for moving the same, an exciting winding in said dynamo for creating an exciting flux therefor, manually operated control means connected to said dynamo output for supplying exciting current and a high percentage of the output voltage as inverse feedback voltage to said dynamo at times of low dynamo output voltage and a proportionately less percentage of the output voltage as inverse feedback voltage at high dynamo output voltage, and means connecting said exciter field and said dynamo output and disposed in the path of movement of said gun for gradually decreasing the output of said dynamo by increasing the percentage of inverse feedback to thereby nullify the effect of the exciting voltage, whereby smooth deceleration of the drive motor armature is obtained from whatever speed was maintained before the gun engaged said last named means in its path to full stop.

3. An electrical system including a generator which is electrically connected to a drive motor armature, an exciting winding in said generator adapted for separate excitation, a source of current, and a pair of potentiometers electrically connected in voltage opposition, and means drivably interconnected with the potentiometers for producing simultaneous operation thereof, one of said potentiometers being connected to the output of said generator for supplying an inverse feedback voltage to said exciting winding, the other of said potentiometers being connected to said source for supplying an exciting voltage and current to said exciting winding, said potentiometer which is connected to the output of said generator being constructed and arranged to furnish a variable inverse feedback voltage that will vary from maximum inverse feedback voltage at no output of the generator and no exciting voltage to zero feedback voltage at full output of the generator and maximum exciting voltage, whereby compensation is made for the IR losses in the generator.

4. An electrical system including a generator which is electrically connected to a drive motor armature, an exciting winding in said generator adapted for separate excitation, a source of current, a pair of potentiometers electrically connected in voltage opposition and constructed to be rotated clockwise or counterclockwise from a neutral position, and a common driving shaft on which the potentiometers are mounted for concurrent operation, one of said potentiometers being connected to the output of said generator for supplying an inverse feedback voltage to said exciting winding, the other of said potentiometers being connected to said source for supplying an exciting voltage to said exciting winding, said potentiometers being linearly wound and constructed and arranged to provide a non-linear "percent maximum motor speed versus percent potentiometer displacement from neutral" relationship as the potentiometers are rotated from neutral.

5. In an electrical system of the class wherein a generator having a separately excited field winding is electrically connected to a drive motor armature for rotating the same, the combination with said exciting winding of a pair of potentiometers connected in voltage opposition so that the difference between the opposed voltages is applied to the exciting field to cause a current to flow therein, said potentiometers being disposed on a single shaft for simultaneous rotation from a neutral position, one of said potentiometers is connected to the generator output for supplying an inverse feedback voltage, the other of said potentiometers is connected to a source independent of said generator output for supplying an exciting voltage, whereby the total output voltage appears across the exciting winding as inverse feedback voltage when the potentiometers are in neutral position so that zero generator output to the drive motor will be assured at this time.

6. An apparatus for use as an electrical amplifier comprising, an electrical control system having a pair of potentiometers electrically connected in voltage opposition, and a shaft interconnecting the potentiometers so that movement of any one of the potentiometers will move the other a corresponding amount, one of the potentiometers being connected to a source of input voltage for supplying a variable input voltage to the system, the other potentiometer being connected to the output of the apparatus for supplying an inverse feedback voltage to the system, which voltage is a percentage of the output voltage of the apparatus, the percentage of the output voltage to be used for inverse feedback voltage varying in inverse proportion to the input voltage.

7. An apparatus for use as an electrical amplifier comprising, an electrical control system having a pair of potentiometers electrically connected in voltage opposition, and a member drivably interconnected to the potentiometers so that rotation of any one of the potentiometers will cause rotation of the other a like amount, one of the potentiometers being connected to a source of input voltage for supplying a variable input voltage to the system, the other potentiometer being connected to the output of the apparatus for supplying an inverse feedback voltage to the system, which voltage is a percentage of the output voltage of the apparatus, said pair of potentiometers being so constituted that the percentage of the output voltage to be used for inverse feedback voltage is varied from 100 per cent of the output voltage to zero per cent of the output voltage as the input voltage is varied from zero to maximum.

HERBERT C. WATERMAN.

REFERENCES CITED

The following references are of record in the file of this patent:

UNITED STATES PATENTS

| Number | Name | Date |
| --- | --- | --- |
| 2,356,152 | Edwards et al. | Aug. 22, 1944 |